United States Patent
Noonan et al.

(10) Patent No.: US 10,462,970 B2
(45) Date of Patent: Nov. 5, 2019

(54) COTTON HARVESTER POWER MANAGEMENT

(71) Applicant: DEERE & COMPANY, Moline, IL (US)

(72) Inventors: James T. Noonan, Bondurant, IA (US); Kevin J. Goering, Cambridge, IA (US); Joel M. Schreiner, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 129 days.

(21) Appl. No.: 15/630,490

(22) Filed: Jun. 22, 2017

(65) Prior Publication Data
US 2018/0368321 A1 Dec. 27, 2018

(51) Int. Cl.
| A01D 46/08 | (2006.01) |
| A01D 69/00 | (2006.01) |
| A01D 46/16 | (2006.01) |

(52) U.S. Cl.
CPC .......... *A01D 46/085* (2013.01); *A01D 46/16* (2013.01); *A01D 69/002* (2013.01)

(58) Field of Classification Search
CPC ...... A01D 45/16; A01D 46/14; A01D 46/085; A01D 69/002; A01D 46/16
USPC .... 56/10.2 A–10.2 H, 10.2 R, 41, 43, 47, 49
See application file for complete search history.

(56) References Cited

U.S. PATENT DOCUMENTS

| 2,848,860 | A |   | 8/1958 | Fergason |   |
| 4,306,403 | A | * | 12/1981 | Hubbard | A01D 75/182 |
|   |   |   |   |   | 192/30 W |
| 5,247,786 | A |   | 9/1993 | Schreiner |   |
| 5,325,656 | A |   | 7/1994 | Schreiner et al. |   |
| 5,406,779 | A |   | 4/1995 | Deutsch et al. |   |
| 5,995,895 | A | * | 11/1999 | Watt | A01B 79/005 |
|   |   |   |   |   | 56/10.2 G |
| 7,275,357 | B2 | * | 10/2007 | Covington | A01D 46/084 |
|   |   |   |   |   | 56/10.2 R |
| 8,006,472 | B1 |   | 8/2011 | Schreiner et al. |   |
| 8,073,599 | B2 | * | 12/2011 | Goering | A01D 46/08 |
|   |   |   |   |   | 56/10.2 G |
| 10,172,287 | B2 | * | 1/2019 | Ostermeier | A01D 69/02 |
| 2008/0046154 | A1 |   | 2/2008 | Bares et al. |   |

FOREIGN PATENT DOCUMENTS

| ES | 2114351 A | 5/1998 |
| IN | 3471/MUM/2013 A | 7/2015 |

* cited by examiner

*Primary Examiner* — Robert E Pezzuto
(74) *Attorney, Agent, or Firm* — Taft Stettinus & Hollister LLP; Stephen F. Rost

(57) ABSTRACT

A cotton harvester having a prime mover providing power to the cotton harvester, a controller monitoring a load on the prime mover and storing a load threshold, a drum rotatable about a first axis at a drum speed, a plurality of spindles for harvesting cotton, the plurality of spindles rotatable at a spindle speed and a doffer assembly rotatable about a second axis at a doffer speed. Wherein, when the controller detects a load on the prime mover greater than the load threshold, the spindle speed is reduced.

20 Claims, 10 Drawing Sheets

COTTON HARVESTER POWER MANAGEMENT

FIELD OF THE DISCLOSURE

The present disclosure relates to a power management system, and in particular, to a power management system that modifies the spindle speed of a cotton harvester.

BACKGROUND OF THE DISCLOSURE

Cotton harvesters with row units include a number of picking units for harvesting cotton. Each picking unit includes at least one drum, and on some units there may be a front drum and a rear drum. In any event, on each drum there is a number of picker bars and on each picker bar there are a plurality of spindles. Each spindle can be tapered and have a barbed surface for removing the cotton from the cotton plant. Each row unit includes a doffer column having a plurality of doffers for removing picked cotton from the spindles. A doffer is a disc that may be coated in rubber or urethane and rotatably driven at a velocity greater than that of the spindles. In a conventional cotton harvester row unit, the spindles move underneath the bottom face of the doffers so that the cotton is unwrapped and stripped from the spindles.

In a conventional cotton picker row unit, there is a single gearbox input for rotatably driving all of the components of the row unit (i.e., the drum, spindles and doffers). During operation, drum speed is synchronized with the ground speed of the machine such that as the machine speed increases, the drum speed increases and vice versa. In many applications, the relationship between ground speed and drum speed is linear. Speed sensors and the like detect or measure ground speed of the machine, and the single gearbox input is controlled accordingly so that drum speed is synchronized to the ground speed. In doing so, the drum rotates when the machine is moving, and the drum is held from rotating when the machine is idle. Likewise, as the drum is rotatably driven, the spindles and doffers are also driven in a similar manner.

In this conventional system, however, the spindle speed is operably controlled in accordance with drum speed. Thus, as the drum speed decreases to match ground speed of the machine, the spindle speed also decreases. In certain situations, the load conditions on the drive system reach a maximum load condition, whereby the drive system cannot adequately power all of the components of the cotton harvester. In conventional drive systems, the speed of the cotton harvester must be reduced during a maximum load condition since there is a single gearbox input driving the drum and spindles together. Thus, there is a need in certain applications to be able to operably control drum speed and spindle speed independently from one another to modify power distribution when a maximum load condition is approached.

SUMMARY

In one embodiment of the present disclosure a cotton harvester has a prime mover providing power to the cotton harvester, a controller monitoring a load on the prime mover and storing a load threshold, a drum rotatable about a first axis at a drum speed, a plurality of spindles for harvesting cotton, the plurality of spindles rotatable at a spindle speed, and a doffer assembly rotatable about a second axis at a doffer speed. Wherein, when the controller detects a load on the prime mover greater than the load threshold, the spindle speed is reduced.

In one example, power to the plurality of spindles is variable relative to power to the claim. In another example, the cotton harvester has a ground drive assembly, an engine fan, and a cotton feeding system. Wherein the load monitored by the controller includes a load generated by the ground drive assembly, engine fan, and cotton feeding system.

In yet another example, the cotton harvester has an engine as the prime mover, the engine having a variable engine speed, and an ideal engine speed threshold stored in the controller. Wherein, when the controller detects a load on the prime mover greater than the load threshold, the spindle speed is reduced and the engine speed remains within the ideal engine speed threshold.

In another example of the above embodiment, a minimum spindle speed threshold is stored in the controller, and the controller maintains the spindle speed above the minimum spindle speed threshold when the load on the prime mover is greater than the load threshold. In yet another example, when the controller detects a load on the prime mover less than the load threshold, the spindle speed is greater than a minimum spindle speed and less than or equal to a maximum spindle speed. In another example, the spindle speed and the doffer speed have a corresponding speed ratio. In another example, the spindle and doffer are mechanically coupled to one another and the spindle speed and the doffer speed is a fixed speed ratio. In another example when the spindle speed is reduced, an indicator generates a signal, wherein the signal is an audible or visual signal.

Another embodiment may be a method for controlling power in a cotton harvester, the method being providing a controller, a prime mover controlled by controller, at least one load sensor communicating to the controller the load on the prime mover, a spindle assembly powered by the prime mover, and a spindle speed sensor communicating a spindle speed generated by the spindle assembly, storing, in the controller, a load threshold and a minimum spindle speed threshold, determining, with the controller, the actual load on the prime mover with the load sensor, determining, with the controller, the spindle speed with the spindle speed sensor, and reducing the spindle speed, with the controller, when the actual load is above the load threshold and the spindle speed is above the spindle speed threshold.

One example of this embodiment includes storing an ideal spindle speed in the controller. Wherein, when the actual load is less than the load threshold, the spindle assembly, rotates at the ideal spindle speed. In this example, when the actual load is greater than the load threshold, the controller instructs the spindle assembly to rotate at a speed between the ideal spindle speed and the spindle speed threshold.

Another example of this embodiment includes providing an indicator capable of indicating a signal to a user, and engaging the indicator, with the controller, to signal the user when the spindle speed is reduced.

Yet another embodiment is a cotton harvester system having a cotton harvester unit, including a controller in communication with the cotton harvester system, a prime mover configured to generate power, a plurality of sub-assemblies powered by the prime mover. Wherein, when the controller identifies a high load condition, power to one of the sub-assemblies is reduced.

In one example of the above embodiment, the sub-assemblies include a spindle assembly configured to rotate spindles at a spindle speed, a doffer assembly configured to rotate doffers at a doffer speed, and a drum assembly configured to rotate drums at a drum speed. In another example, the prime mover provides power to the subassemblies through any of a hydraulic pump, an electric generator, or a mechanical linkage. In yet another example one of the plurality of sub-assemblies is a spindle assembly provided hydraulic power from the prime mover. In the hydraulic example, hydraulic power to the spindle assembly is reduced when the controller identifies the high load condition. In another example, one of the plurality of sub-assemblies is a spindle assembly provided electric power from a generator powered by the prime mover.

BRIEF DESCRIPTION OF THE DRAWINGS

The above-mentioned aspects of the present disclosure and the manner of obtaining them will become more apparent and the disclosure itself will be better understood by, reference to the following description of the embodiments of the disclosure, taken in conjunction with the accompanying drawings; wherein.

Corresponding Reference Numerals are Used to Indicate Corresponding Parts Throughout the Several Views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
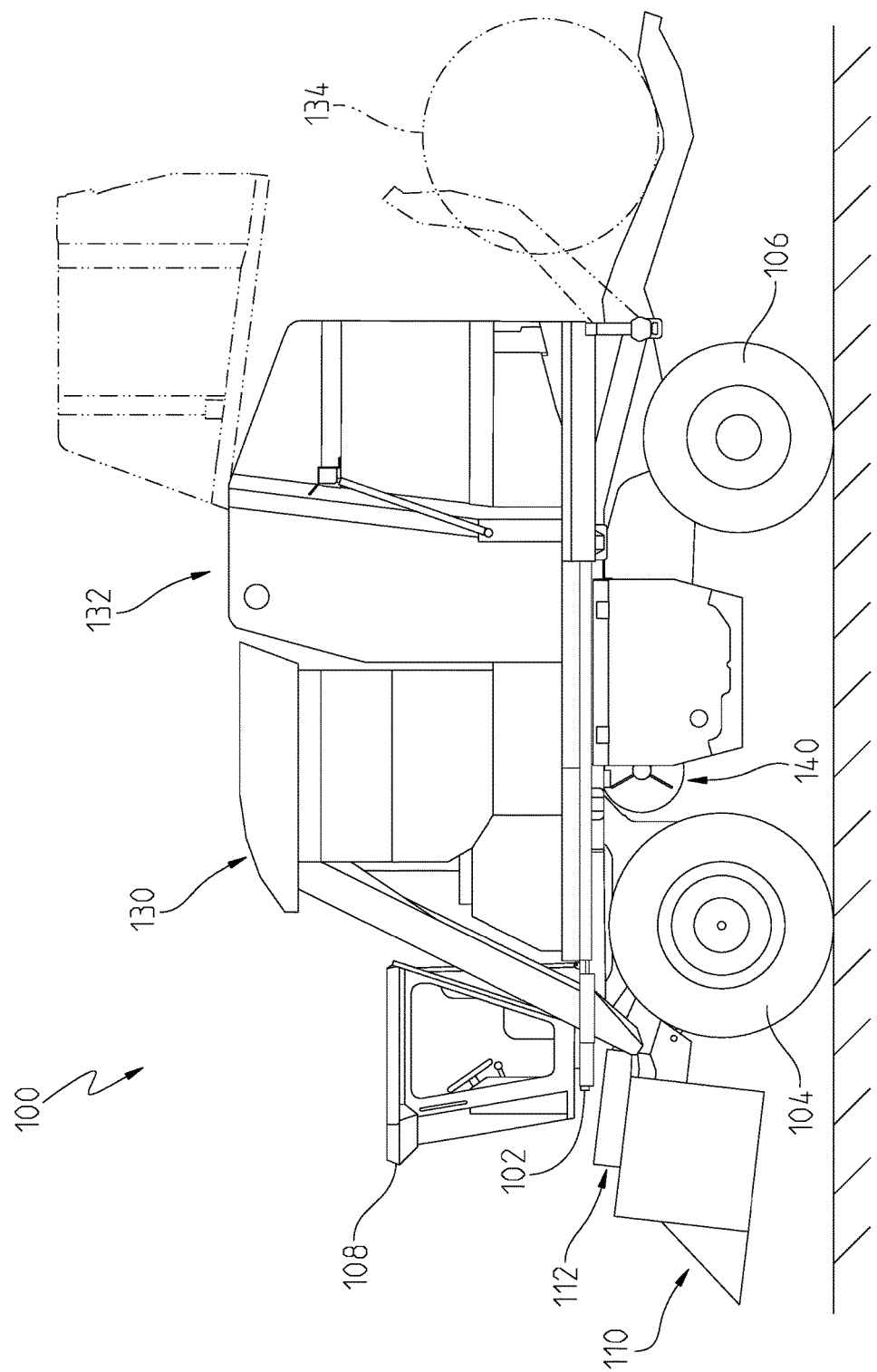
FIG. 1 is a side view of a cotton harvester.

Referring now to FIG. 1, one embodiment of a cotton harvester 100 is shown having a main frame 102 supported for movement by forward drive wheels 104 and rear steerable wheels 106. An operator station or cab 108 is supported at the front end of the main frame 102 above forwardly mounted cotton harvesting units 110 which removes cotton from plants and directs the removed cotton into an air duct system 112.

An accumulator system 130 is shown coupled to the frame 102 behind the cab 108 for receiving the cotton from the air duct system 112. The accumulator system 130 stores cotton as necessary, and a metering floor uniformly distributes the cotton to a module builder 132 which first forms a compressed mat of material and then rolls the mat into a compact bale or module 134.

While the cotton harvester 100 may have several motors and drive systems for powering sub-assemblies as described in more detail below, a prime mover 140 is the primary source of power to the sub-assemblies. More specifically, in one embodiment, the prime mover 140 may be a diesel or gas engine. The prime mover 140 may provide power to a ground drive, cotton fan, engine fan, and a cotton feeding system to name a few sub-assemblies. Further, the sub-assemblies may be powered through a hydraulic pump, electric generator, and/or mechanical drivetrain to name a few of the drive systems for the sub-assemblies driven by the prime mover 140.

While diesel and gas engines are described herein for the prime mover 140, other types of engines and drive systems are also considered. In one example, the prime mover may be a turbine engine. In another example, the prime mover may be an electric motor. In yet another example, the prime mover may by a hybrid combination of the diesel, gas, or turbine engine along with an electric generator and motor. Accordingly, many different types of prime movers 140 are considered herein, and no single type should be limiting.

This disclosure is not limited to the particular cotton harvester 100 shown in FIG. 1 and described above. Rather, this disclosure applies to any cotton harvester that utilizes spindles to harvest cotton and the cotton harvester 100 is only used as one example of such an application.

Figure 2:
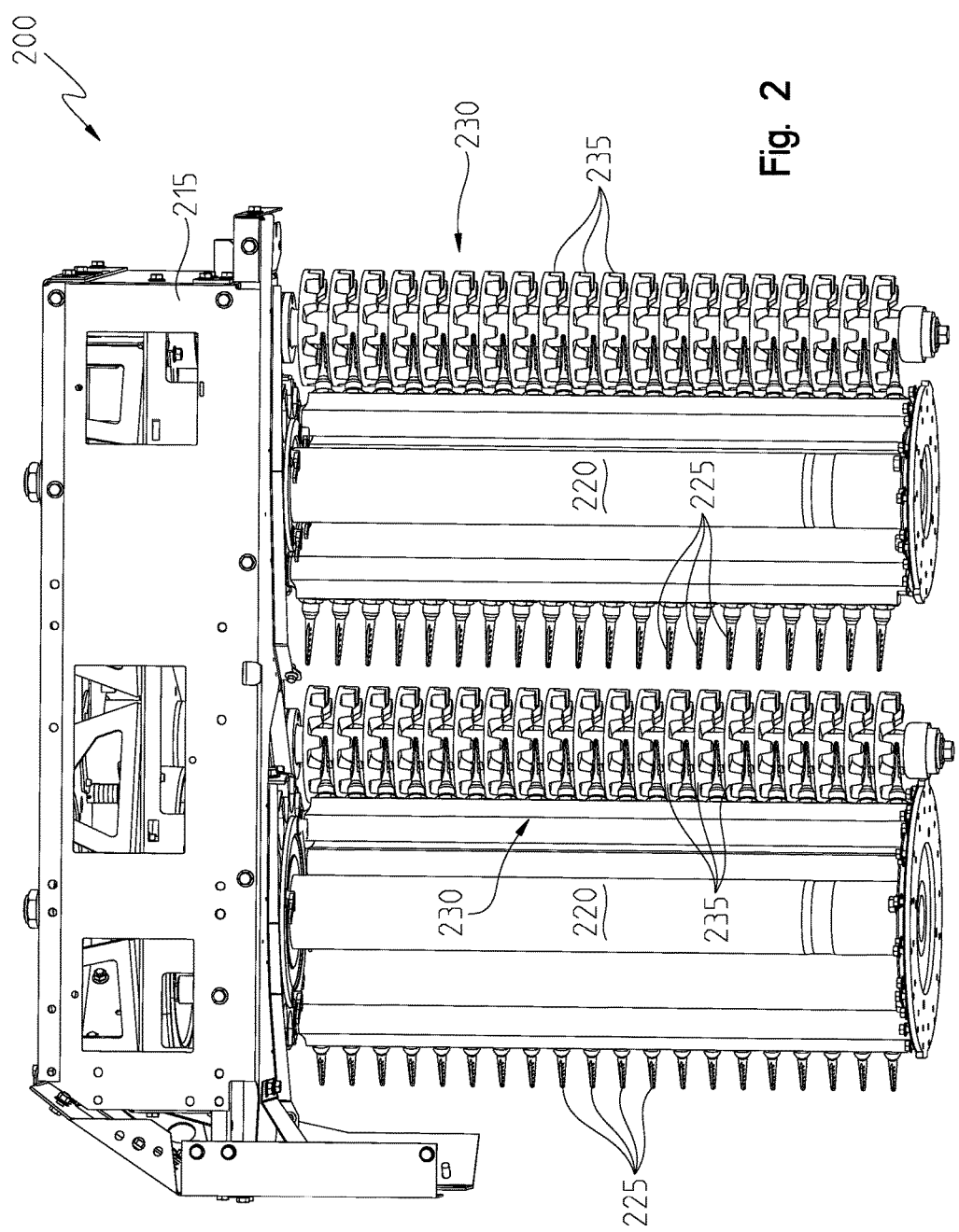
FIG. 2 is a side sectional view of a portion of a cotton picker row unit.
Figure 5:
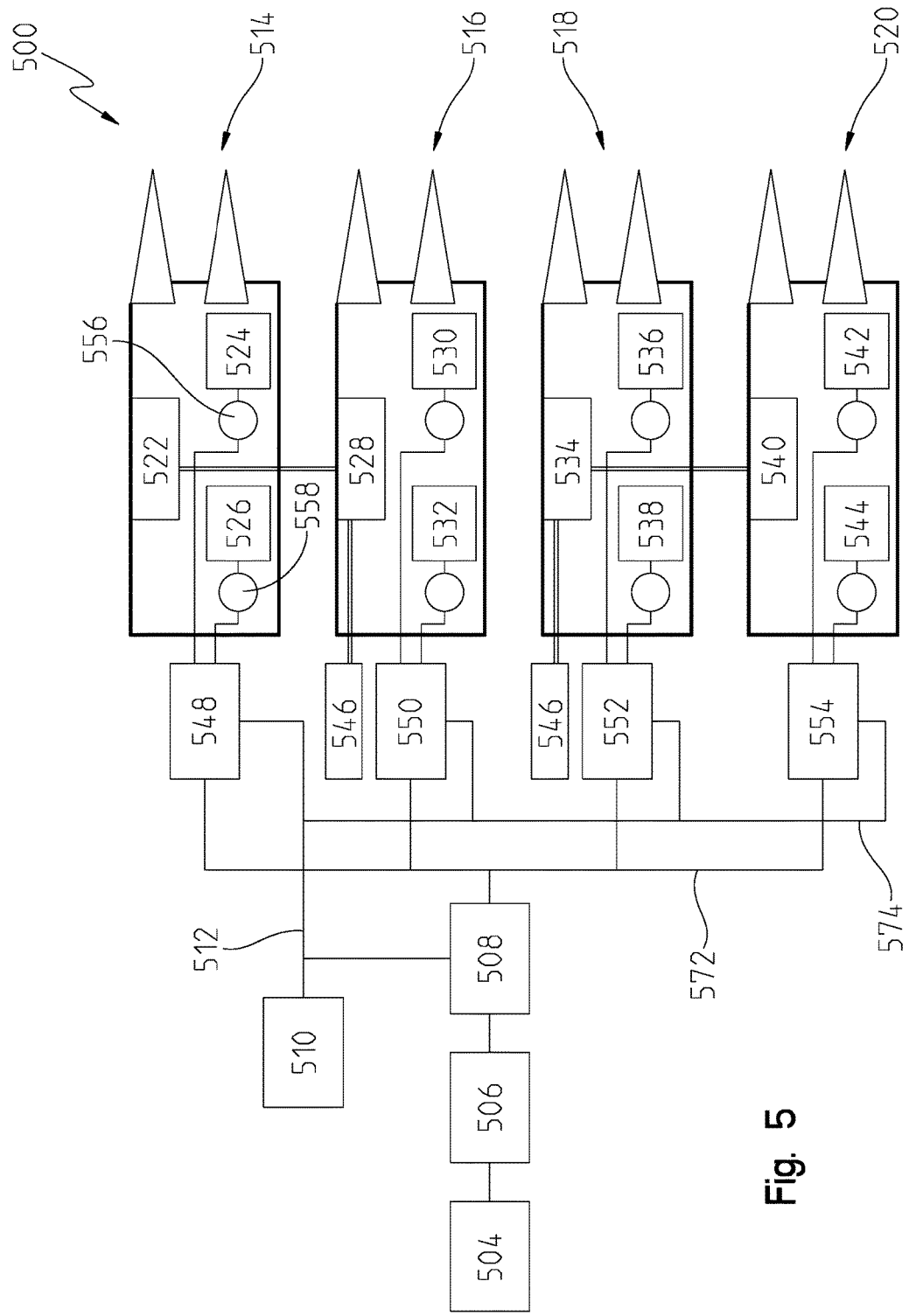
FIG. 5 is a schematic control system for controlling the independent drum drive system of FIG. 4.

Referring to FIG. 2, one of the forwardly mounted cotton harvesting units 110 is illustrated isolated from the cotton harvester 100. More specifically, a conventional cotton harvester unit 200 is illustrated. The illustrated cotton harvester unit 200 may include a plurality of picking units. In FIG. 5, for example, the cotton harvester unit 200 may include four different picking units. Other machines may include a different number of picking units. In any event, each unit may include a frame 215. A drum 220 is rotatably coupled to the frame 215. In at least one picking unit, there may be a front drum 220 and a rear drum 220, A plurality of rows of spindles 225 is rotatably coupled to each drum 220. A doffer column 230 having a plurality of doffers 235 is rotatably supported by a bearing housing (not shown). The plurality of doffers 235 is positioned adjacent the spindles 225 and configured to remove cotton from the spindles 225. The bearing housing (not shown) may be threadably engaged with a fixed housing (not shown), which is coupled to the frame 215.

In the conventional system of FIG. 2, power comes from the prime mover into a gearbox and transfers via an output shaft to an idler gear stack (not shown). The power is split between the drum and spindles. A gear connects the doffers to the spindles such that a relationship between the speeds of the doffers and spindles is maintained. In this system, the doffers and spindles are rotationally driven by the same drive system. An example of this is shown in FIG. 3.

Figure 3:
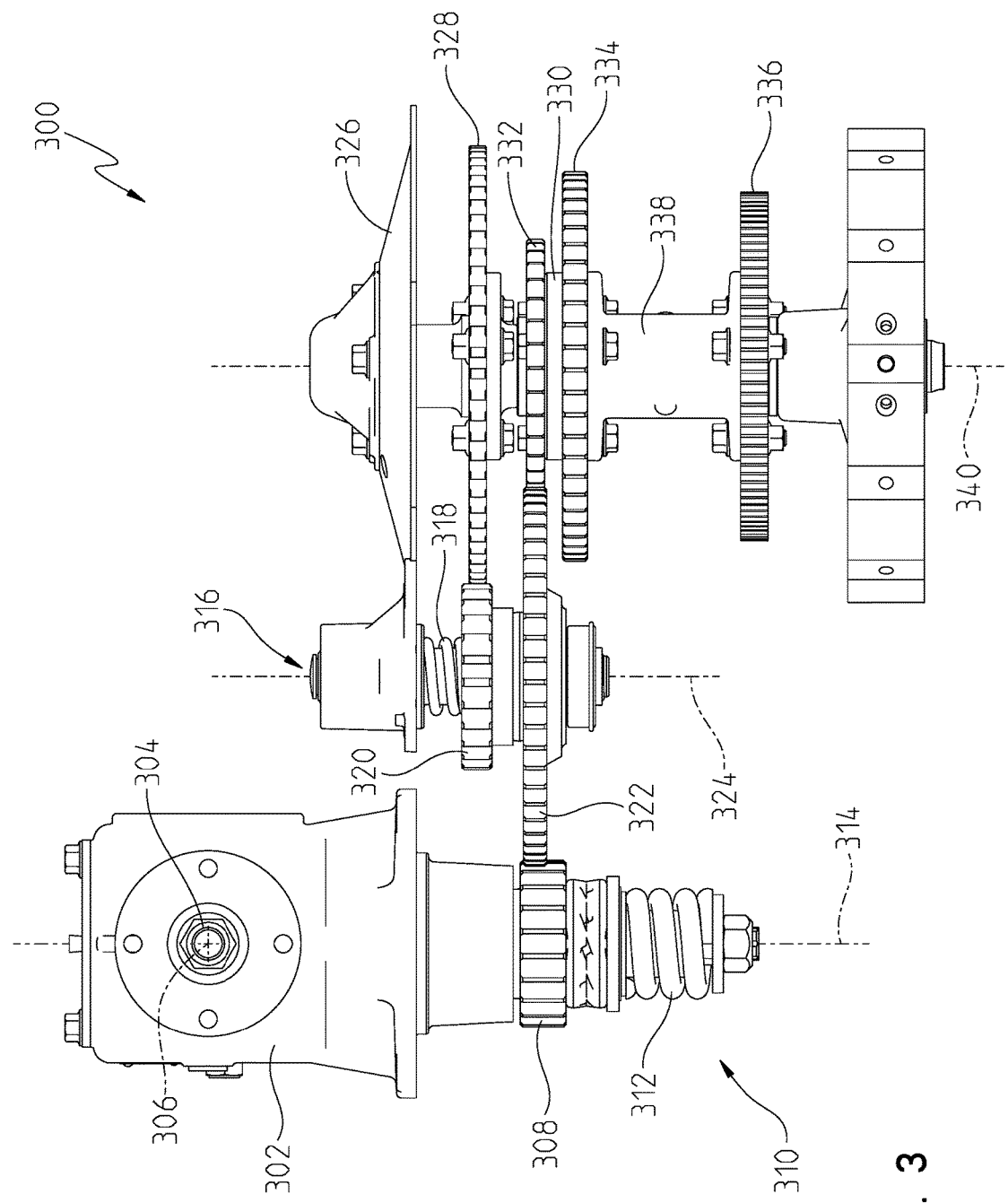
FIG. 3 is a side partial view of a conventional row unit drive system.

Referring to FIG. 3, an example of a conventional row unit drive system 300 is illustrated. In this embodiment, the system includes an outer gear casing 302 that is oriented vertically about a first vertical axis 314. A horizontal input shaft 304 is coupled to the gear casing 302 along a horizontal axis 306, and input power is delivered via the shaft 304. In one example, the horizontal shaft 304 may be driven hydraulically via a hydraulic pump and motor. Although not shown, a 90° bevel gearset may be coupled to the input shaft 304 within the gear casing 302 to transfer the power from the shaft 304 to a single input gear 308. The input gear 308 represents the single power input to the conventional picking unit. As also shown, a gear case slip clutch assembly 310 may be disposed along the vertical axis 314 and coupled to the gear case 302 in any known manner. The gear case slip clutch assembly 310 may include a spring 312 for axially moving the input gear along the axis 314 based on various torque loads.

The input gear 308 may transfer power to a gear case idler assembly. The gear case idler assembly is vertically disposed about a second vertical axis 324; it includes a drum slip clutch assembly 316. The drum slip clutch assembly 316 is spring-loaded via a spring 318 and includes a set of slip clutch jaws (not shown) located between a first drive gear 320 and a second drive gear 322. If a torque overload or plugged condition occurs, the clutch slips such that the first drive gear 320 moves axially along the second vertical axis 324 on the slip clutch jaws. This prevents damage to the various components of the row unit when the unit is plugged or a torque spike is input into the unit.

The power from the input gear 308 is split into two power flow paths at the gear case idler assembly. The first power flow path is transferred via the first drive gear 320 to a drum driven gear 328, and the second power flow path is transferred via the second drive gear 322 to an output gear 332. The drum driven gear 328 transfers power to rotatably drive the one or more drums of the row unit. The gear 328 is coupled to another gear stack along a third vertical axis 340. The drum driven gear 328 is further coupled to a portion of the row unit frame or structure 326.

The output gear 332 is also aligned axially along the third vertical axis 340. The output gear 332 is further coupled to a hub 330 and shaft 338 as shown in FIG. 3. Two additional gears are rotatably driven via the power transferred to the output gear 332, i.e., a doffer drive gear 334 and a spindle drive gear 336. Thus, all three gears rotate at the same speed. Although not shown in FIG. 3, the doffer drive gear 334 drives an idler gear, which in turn drives a doffer driven gear located on a doffer shaft. The plurality of doffers is then rotatably driven by the doffer driven gear and doffer shaft.

The spindle drive gear 336 operably drives the plurality of spindles for picking cotton. In the conventional drive system of FIG. 3, the drum drive gear 328 and spindle drive gear 336 are coupled to one another via the drum slip clutch assembly 316. In effect, the drum drive gear controls drum speed, and the spindle drive gear controls spindle speed. In this system, both drum speed and spindle speed are controlled via the same input, i.e., the input gear 308.

For purposes of this disclosure, a unit drive with controllable spindle speed to drum speed ratio may be utilized similar to that disclosed in U.S. Pat. No. 8,006,472 ("the '472 Patent") to Deere & Company, the reference of which is incorporated herein in entirety. The '472 Patent discloses a selectively variable speed motor which may be hydraulic or electric and which may be infinitely variable. The ratio of the spindle rotational speed to the drum rotational speed may be adjusted over a wide range of values by varying the speed and direction of rotation of the motor. The ratio may be adjusted by a controller connected to the motor to vary motor speed in either direction of rotation. The controller is responsive to harvester ground speed and adjusts drum to spindle speed ratio and controls the drive to the main drive shaft via controller output to maintain synchronization of the drum speed to harvester speed. When the harvester is slowed and drum speed must slow to maintain synchronization of the drum with the plants entering the row receiving area, the controller will adjust the output and the speed of the motor to provide the necessary main drive shaft speed and drum speed while maintaining the spindle rotational speed at or near the speed for optimum picking efficiency. At higher row unit speeds, the controller may adjust the drum to spindle speed ratio by varying the speed of the motor and main drive shaft to prevent driving of the spindles above maximum desired rpm.

In the embodiment described in the '472 Patent, doffer rotational speed may be synchronized to spindle rotational speed for efficient doffing and for prevention of doffer over-speeding. The doffer rotational speed may also be controlled to maintain doffer speed below critical, even when the row unit is operated at high speeds, by varying the ratio as described above.

Figure 4:
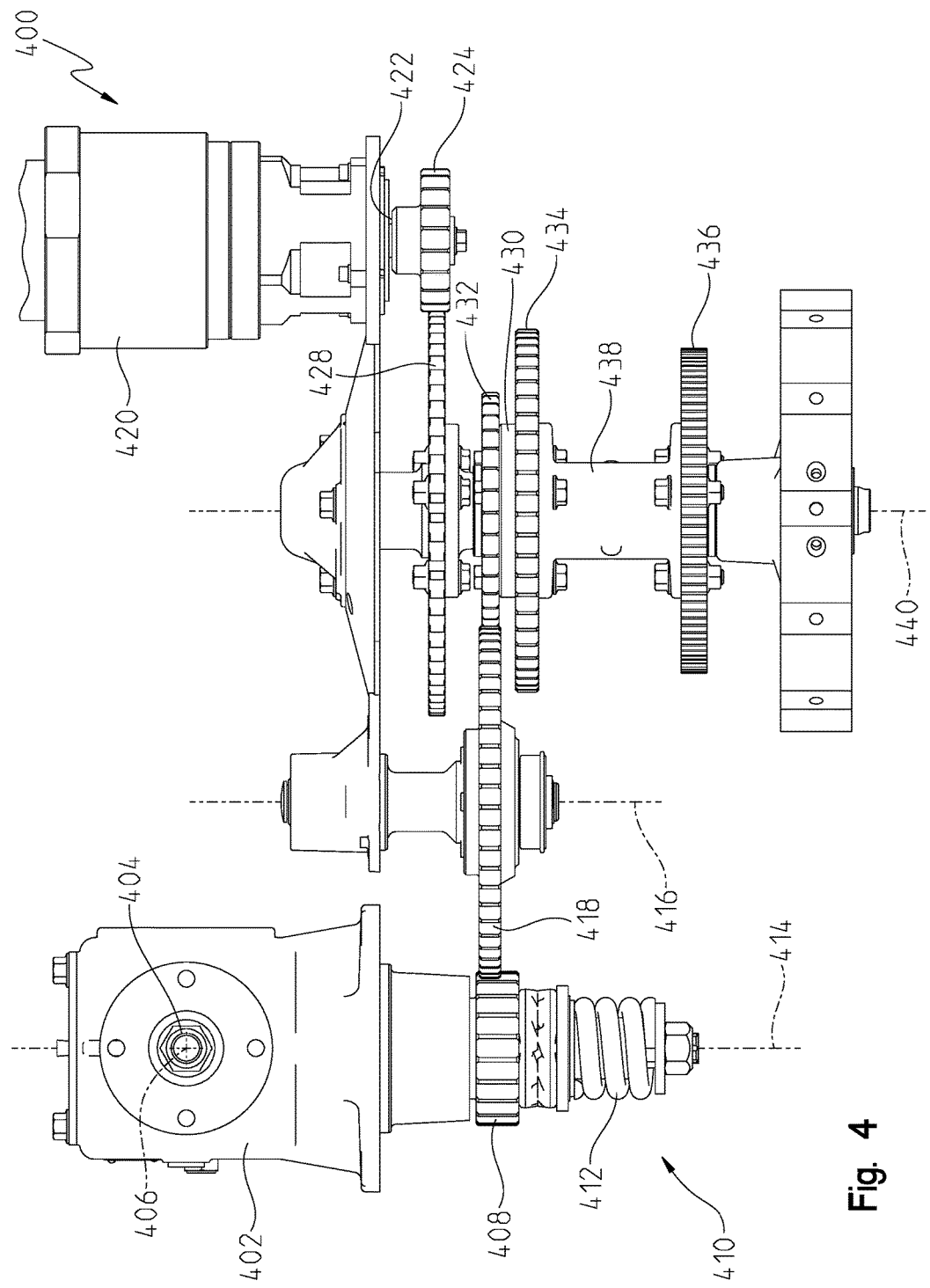
FIG. 4 is a side partial view of an independent drum drive system for a row unit.

In FIGS. 4 and 5, a different drive system for a row unit is shown. For purposes of this disclosure, the independent drum drive system of FIG. 4 may be similar to that disclosed in in U.S. patent application Ser. No. 15/281,153 to Deere & Company, the reference of which is hereby incorporated herein. In this system 400, the aforementioned drum slip clutch assembly 316 is removed.

Referring to the embodiment of FIG. 4, a gear case 402 may be provided in which an input shaft 404 transfers power to the row unit drive system. The input shaft 404 may be horizontally oriented with respect to the gear case 402 along a horizontal axis 406. Similar to the embodiment of FIG. 3, a 90° bevel gearset located inside the gear case 402 may be coupled to the shaft 404 and transfer the power from the input shaft 404 to an input gear 408. The gear case 402 may include a gear case slip clutch assembly 410 with a spring 412. As shown, the gear case 402 and input gear 408 may be axially aligned along a first vertical axis 414.

The input gear 408 may be rotatably coupled to a drive gear 418 as shown in FIG. 4. The drive gear 418 is the only gear shown along a second vertical axis 416, and it is designed to transfer power to the spindles and doffers. As shown, the drive gear 418 is coupled to an output gear 432. The output gear 432 is rotatably coupled to a doffer drive gear 434 and a spindle drive gear 436 via a hub 430 and shaft 438. As the output gear 432 rotates, the doffer drive gear 434 and spindle drive gear 436 rotate at substantially the same speed. Moreover, each of these gears are vertically stacked or spaced relative to one another along a third vertical axis 440, as shown in FIG. 4.

Also disposed along the vertical axis 440 in FIG. 4 is a drum drive gear 428. The drum drive gear 428, however, is not rotatably driven by the input gear 408. Instead, a separate drive unit 420 may be provided for driving the drum drive gear 428. In this embodiment, an electric motor 420 is shown as the drive unit. In other embodiments, however, the drive unit may be a hydraulic motor or a mechanical drive system. In one example, the drum drive unit may be an independent infinitely variable drive system. In any event, the drive unit is a separate input to the row unit and provides power to drive the drum independently from the spindles. In other words, unlike conventional drive systems, the first input gear 320 of FIG. 3 is removed and drum speed is independent from spindle speed in the illustrated embodiment of FIG. 4. Moreover, the row unit has two inputs, i.e., the input gear 408 and the drive unit 420.

The drive unit 420, or electric motor, may include a drive shaft 422 that rotatably, drives a second input gear 424. The second input gear 424 may be coupled or splined to the drum drive gear 428 in order to generate drum speed. In the embodiment of FIG. 4, the drive unit 420 operably drives the drum drive gear 428. In other embodiments, the drive unit 420 may drive two or more drums. In those embodiments, the size of the drive unit 420 may be customized to deliver the requisite amount of power to each drum.

In one example, the drive unit 420 may operably drive a front drum and a rear drum of a picking unit. In this example, the front and rear drums may be mechanically coupled to one another via a belt, chain, gearing, or other mechanical coupling device. In a second example, a single drive unit may operably drive one or more drums on two or more picking units. In this example, there may be three picking units each having a front and a rear drum. Here, the single drive unit may operably drive all six drums. The drive unit may be directly coupled to one of the drums, and then the other five drums may be mechanically coupled to one another. In an embodiment in which a single drive unit is operably driving two or more drums, a slip clutch or the like may be disposed on a drum drive shaft and incorporated with the drum drive gear to protect the drum drive components in case of a plug or excessive load. On the contrary, when there is a single drive unit per drum, the slip clutch can be removed from the drum and is unnecessary because torque and speed can be controlled by the drive unit 420 (particularly when the drive unit is an electric motor).

In an alternative embodiment, the drum drive input may be integrated in the location of the drum slip clutch assembly 316 in FIG. 3. Although an illustrated embodiment of this is not provided, an electric motor may electrically power a motor shaft which drives a planetary gearset. For instance, a sun gear of the planetary gearset may be coupled to the shaft, and power may be transferred from the sun gear to a carrier member rotatably supporting one or more pinion gears. A ring gear of the planetary gearset may be fixedly mounted to a motor housing or frame of the row unit. The carrier member may operably drive a drum drive gear similar to the drum drive gear 428 in FIG. 4. The motor shaft, planetary gearset, drum drive gear, and a drive gear similar to the drive gear 418 in FIG. 4 may be coaxially aligned along the second vertical axis 416. In this alternative embodiment, however, the motor rotatably drives the drum drive gear, but does not power the separate drive gear. The drive gear 428, similar to the one shown in FIG. 3, may be driven by the input gear 408 as described above.

In the above described embodiments in which the drum drive is separate from the spindle drive, the use of an electric motor allows for independent control for different applications. Whether the application is a high or low yield, the drum speed can be synchronized with ground speed and the spindles may be operably driven at a desired speed to achieve efficient picking. For example, a controller may command motor speed based on a detected ground speed of the cotton harvester row unit. Drum speed may be operably controlled up to a maximum drum speed limit, and this may still be achieved via a linear relationship with ground speed. Spindle speed, however, may be controlled differently. For example, it may be desirable to achieve maximum spindle speed at different drum speeds.

In one example, a machine operator may have a user control located within a cab of the machine to control spindle speed. For instance, the operator may desire a certain maximum spindle speed, and from the cab, be able to control the speed to such. In another example, the operator may be able to set maximum spindle speed at a certain ground speed. Thus, when the machine reaches a certain ground speed (e.g., 3 mph), the spindles may be driven at their respective maximum speed. Again, this is independent of drum speed since the one or more drums of a given row unit are controlled by a separate drive unit electric or hydraulic motor).

For purposes of this disclosure, an electric drive system is only one of several embodiments contemplated herein. An independently controlled hydraulic drum drive system is also possible. In this embodiment, hydraulic pressure may be measured to detect a plugged condition or excessive load, and the pressure may be compared to a pressure threshold. With a hydraulic system, load and speed sensing may be executed by pressure and speed sensors, respectively.

Referring now to FIG. 5, a first embodiment of a control system 500 for controlling an independent drum drive system of a cotton harvester row unit is shown. The row unit may include a main drive unit such as the prime mover or engine 140. The engine 140 may be an internal combustion engine or any known type of engine capable of producing mechanical power that drives a gearbox 504, transmission unit, auxiliary drive unit, and any other sub-assemblies. The gearbox or transmission unit 504 may be a continuously variable or an infinitely variable device. Alternatively, it may be a device capable of producing various gear or speed ratios. In any event, the mechanical power from the engine 140 may be converted to electrical power via a generator or alternator unit 506. In one example, the unit 506 may be an alternator with a rectifier. Various electronics 508 may allow for voltage control to control a plurality of different picking units. In an alternative embodiment, the electronics 508 may include an inverter capable of converting electrical power to mechanical power from the generator unit 506 to provide backup power to the gearbox 504, cooling fans and other mechanically-driven sub-assemblies of the row unit.

The control system 500 may include a controller 510 such as a head interface controller (HIC). The controller 510 may be in electrical communication with the generator or alternator unit 506 and electronics 508 via a communication network such as a CAN bus 512. The controller 510 may communicate to or receive voltage commands from the electronics 508. In any event, electrical power may be supplied to the plurality of picking units as shown in FIG. 5.

In the illustrated embodiment of FIG. 5, the cotton harvester row unit may include four picking units, namely, a first picking unit 514, a second picking unit 516, a third picking unit 518, and a fourth picking unit 520. In another embodiment, however, there may be six picking units. In a further embodiment, there may be two picking units. The present disclosure is not limited to any number of picking units, and thus the independent drum drive system may be incorporated into any number of picking units based on the teachings of the present disclosure.

Each picking unit may include a spindle and doffer drive and a front and rear drum drive. Alternatively, each picking unit may only include a single drum. As described above with reference to FIG. 4, each picking unit may include one input for driving the one or more drums and a second input for driving the spindles and doffers. In the illustrated embodiment of FIG. 5, each picking unit may include a front drum and a rear drum. In this example, a plurality of spindles may be rotatably driven by the front drum and a plurality of spindles may be rotatably driven by the rear drum. In any event, the front drum drive and rear drum drive may be independent from the spindle and doffer drive.

In FIG. 5, for example, the first picking unit 514 may include a spindle and doffer assembly 522, a front drum assembly 524, and a rear drum assembly 526. For purposes of orientation, "front" is intended to mean towards a front end of the picking unit and "rear" is intended to mean towards a rear end of the picking unit. Moreover, for purposes of this disclosure, "drum drive" may also be referred to as "drum assembly" and vice versa. The drum drive or drum assembly may include the drum and various gears (such as those shown in FIG. 4) or other structure required to drive the drum. The drum assembly is separate from the drum drive unit, which in FIG. 5 is shown as an electric motor but which may also be a hydraulic motor or mechanical drive unit. The spindle and doffer assembly may include the different gears, hubs and shafts along with the plurality of spindles and doffers.

The second picking unit 516 may include a spindle and doffer assembly 528, a front drum assembly 530, and a rear drum assembly 532. Likewise, the third picking unit 518 may include a spindle and doffer assembly 534, a front drum assembly 536, and a rear drum assembly 538. Further, the fourth picking unit 520 may include a fourth spindle and doffer assembly 540, a front drum assembly 542, and a rear drum assembly 544.

As in harvester row unit of FIG. 4, each spindle and doffer assembly may be mechanically driven by a variable mechanical power unit 546. The mechanical power unit 546 may be controlled by the controller 510 to provide variable spindle and doffer speeds. For instance, the engine 140 may provide mechanical power to a gear case controlled by the controller 510 which provides power to the spindle and doffer assembly. In FIG. 5, mechanical power 546 may be provided to the second spindle and doffer assembly 528, which is mechanically coupled to the first spindle and doffer assembly 522. As such, mechanical power 546 is transferred through a first flow path to the first and second spindle and doffer assemblies of the first and second picking units, respectively. Likewise, mechanical power 546 may be transferred through a second flow path to the third and fourth spindle and doffer assemblies of the third and fourth picking units, respectively. Thus, there is a mechanical coupling between the first and second picking units and the third and fourth picking units.

The spindle and doffer assembly may also be electrically or hydraulically driven by a motor controlled by the controller 510. For example, in the embodiment of FIG. 4, the horizontally input shaft 404 may be driven by a hydraulic or electric motor. In this example, the drive system of the spindle and doffer assembly may be controlled by the controller 510 with a closed loop, speed-controlled hydraulic pump.

In the embodiment of FIG. 5, the drum drive system is an electric drive system controlled by an inverter. The inverter may be a John Deere CA6 56 VDC inverter. In any event, the inverter may be in electrical communication with the controller 510 over the CAN bus 512. The controller 510 may detect or receive ground speed measurements from a speed sensor or other sensing device (not shown), and then communicate drum speed commands over the CAN bus 512 to the inverters for controlling the drum speed of each drum assembly. In a further embodiment, a CAN bridge may operably couple one or more inverters to the controller 510 to receive speed commands therefrom. In this manner, drum speed can be synchronized with ground speed via a linear relationship as described above. It is worth noting that while drum speed may be linearly synchronized with ground speed, the drum speed is independent of spindle speed. Thus, spindle speed may be variably controlled via the controller relative to ground and drum speed.

In FIG. 5, for example, the first picking unit 514 includes a first inverter 548. Similarly, the second picking 516 includes a second inverter 550, the third picking unit 518 includes a third inverter 552, and the fourth picking unit 520 includes a fourth inverter 554. Each inverter may function in a manner similar to that previously described. Moreover, each inverter may include dual outputs, or it may be a dual inverter each with individual outputs.

In the embodiment of FIG. 5, the front and rear drums may be electrically driven by its own electric motor. For example, in the first, second, third, and fourth picking units 514, 516, 518, 520 the front drum 524 may be electrically powered by a first front motor 556 and the rear drum 526 may be electrically powered by a first rear motor 558. The first front motor 556 and first rear motor 558 may be in electrical communication with the first inverter 548. In one aspect, wires or cables may electrically couple each motor to the first inverter 548. In a different aspect, the inverter may wirelessly communicate with each motor.

In each picking unit, the respective inverter may be electrically coupled or in electrical communication via electrical communication line 572 with the generator unit 506 and electronics 508. Moreover, each inverter may be in communication with the controller 510 via the CAN bus 512 or any other communication line. The inverter of each picking unit may receive from or send commands via a command line 574 to the controller 510. These commands may relate to inputs received from each motor. Inputs may include torque, speed, temperature, etc.

In one example, the controller 510 may include a memory unit and processor. The memory unit may include storage for storing one or more algorithm, software programs, look-up tables, graphical data, threshold values, and the like. Here, the memory unit may store a first torque limit, a second torque limit, a first speed limit, and a second speed limit. If, during operation, either the first torque or speed limit is exceeded, the controller 510 may send an alert to the operator of the cotton harvester row unit that the torque or speed on a particular electric motor is reaching its upper limit. The operator may then take corrective action to reduce the torque or speed on the motor. If the second torque or speed limit is reached, the controller 510 may send another or different warning to the operator. In addition or alternatively, the controller 510 may send a signal to the inverter to shut down electrical power to the electric motor. In some embodiments, the same signal may be sent to each of the inverters to shut down all of the electric motors. This type of system allows for preventative maintenance and reduces potential damage to the various row unit components.

Figure 6:
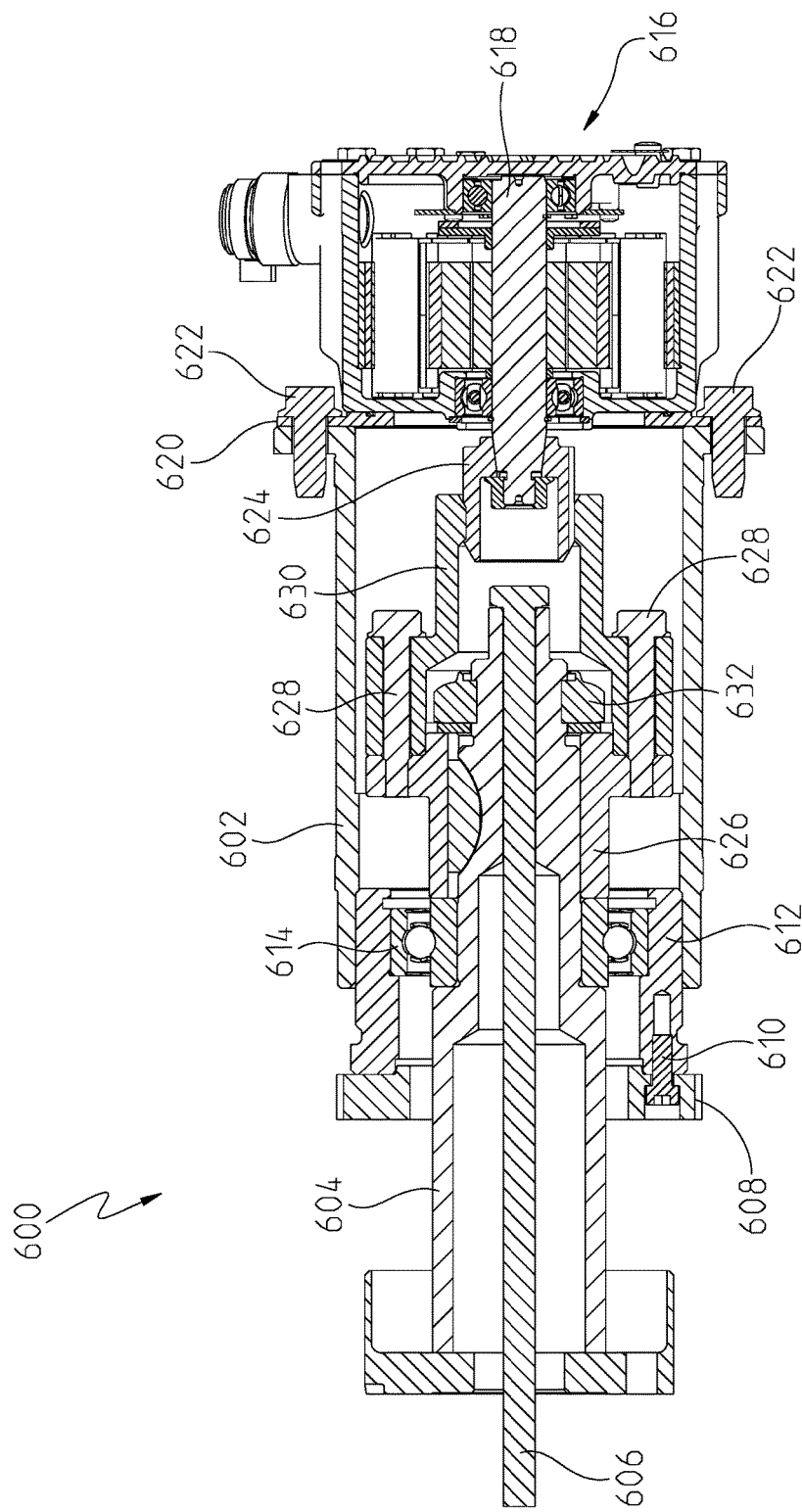
FIG. 6 is a section view of an embodiment with an independent doffer drive system.

In FIG. 6, another embodiment of the present disclosure considers the use of an independent doffer drive system similar to that disclosed in U.S. patent application Ser. No. 15/277,035 to Deere & Company, the reference of which is incorporated herein in its entirety. Referring to FIG. 6, one embodiment of an independent doffer drive system 600 is illustrated. In this embodiment, the system includes an outer doffer housing 602 and a top cover 620 that define an inner cavity in which a doffer adjustment device including a shaft 604 is disclosed. The top cover 620 may be coupled to the doffer housing 602 via one or more fasteners 622. For purposes of this disclosure, the doffer adjustment device may be similar to that disclosed in U.S. Pat. No. 8,572,941 to Deere & Company.

A doffer retention bolt 606 may extend vertically through the doffer adjustment shaft 604 and into an inner cavity of the doffer housing 602. The doffer adjustment device may further include a doffer adjustment ring gear 608. The ring gear 608 may be removably coupled to a bearing housing 612 via one or more fasteners 610. The bearing housing 612 may define a location to substantially enclose a bearing 614, such as a roller bearing, which provides support to the adjustment shaft 604. A locknut or fastener 632 may also substantially surround the doffer adjustment shaft 604 as shown in FIG. 6.

As also shown, the system 600 may include a drive unit 616. In this embodiment, the drive unit 616 is shown as an electric motor. The electric motor may include a motor shaft 618 for providing input power to the doffer unit. In this embodiment, the drive unit 616 and shaft 618 are axially aligned with the doffer housing 602 and plurality of doffers (not shown). In this manner, the motor shaft 618 is disposed along a vertical axis defined therethrough, and a doffer column may be arranged axially along the vertical axis. Power from the motor may be transferred from the shaft 618 to a motor coupler 624. The motor coupler 624 may include internal splines that are coupled to corresponding splines on the motor shaft 618. Likewise, the motor coupler 624 may include external splines or a tapered shaft with a key that are coupled to a complimentary coupler 630. The driven coupler 630 may be further coupled to a coupler interface adapter 626 via one or more fasteners 628 such as bolts, screws, and the like. The coupler interface adapter 626, or second coupler, may replace a conventional doffer driven gear that is present in the embodiment of FIG. 3. Conventionally, the doffer driven gear receives mechanical power from the gear stack to drive the doffer unit. In the embodiment of FIG. 6, however, electrical power from the electric motor 616 drives the doffer unit independently from the drum and is controlled through the controller 510. Further, in one embodiment of FIG. 6 the spindles are mechanically coupled to the doffer unit and the speed of the electric motor dictates both doffer and spindle rotation speed.

While an electric motor is depicted in FIG. 6 as the drive unit, for purposes of this disclosure any known type of drive unit may be used to drive the doffer unit. For instance, the doffer system may be driven electrically, hydraulically, or mechanically.

The above disclosure describes several different embodiments for allowing the spindles, doffers, and drums of the cotton harvester unit 200 to be independently powered, or powered in varying combinations, by an electric, hydraulic, mechanical or the like system. Further, the power systems for the spindles, doffers, and drums can be controlled by the controller 510 to vary the power consumption of the corresponding sub-assembly. Among other reasons, allowing the spindle and doffer speeds to be independently managed from the drum speed and vehicle speed may allow for a more efficient use of the prime mover 140 of the cotton harvester 100.

The prime mover 140 may be required to power several different sub-assemblies of the cotton harvester 100. As a non-exclusive example, the prime mover 140 may power, either directly or indirectly (through mechanical, hydraulic, or electrical systems), the doffer assembly, spindle assembly, drum assembly, a ground drive system, engine fans, cotton feeding systems, module builders, etc. Under certain conditions, it may be beneficial to reduce power to certain sub-assemblies of the cotton harvester 100 to ensure other sub-assemblies remain fully powered.

Figure 7:
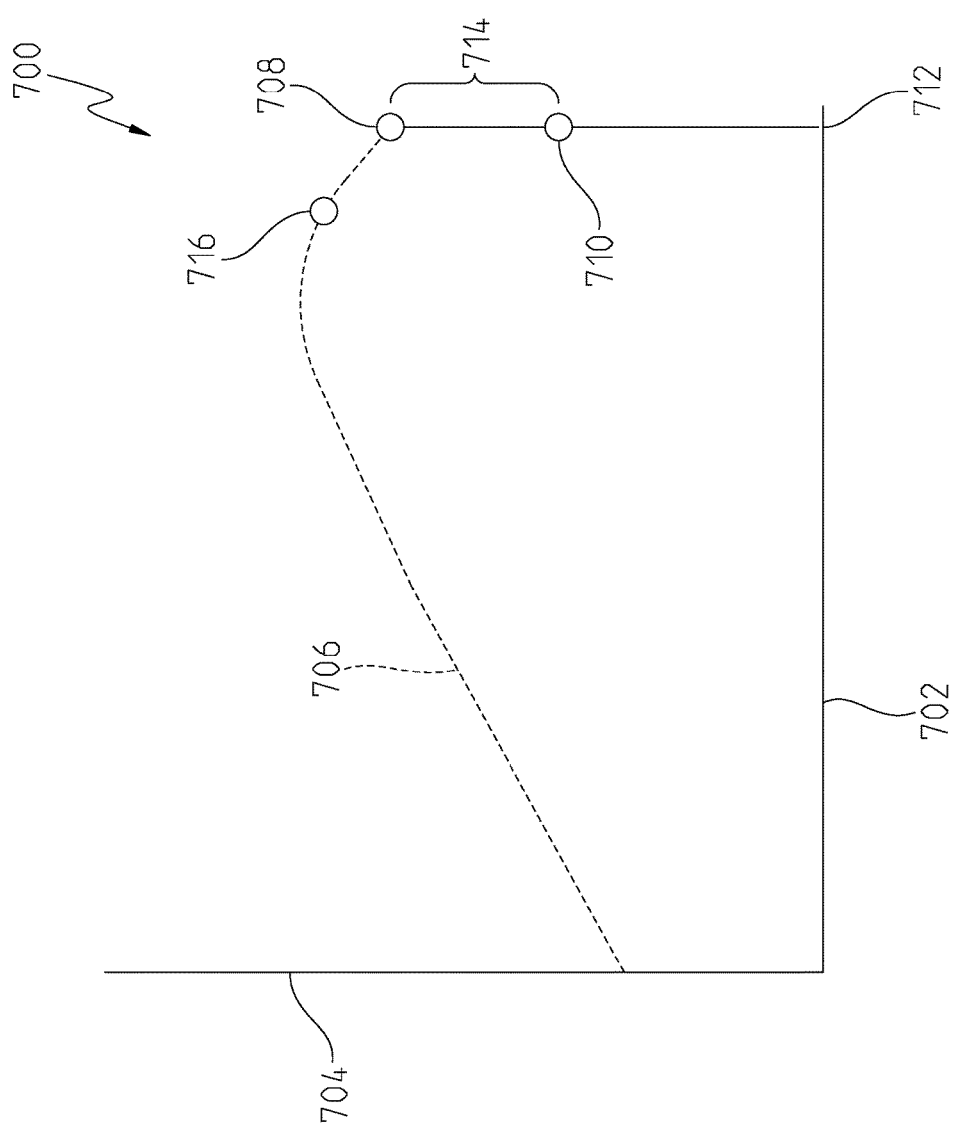
FIG. 7 is a graph view representing power versus engine speed of a prime mover in a cotton harvester.

Referring now to FIG. 7, a typical power versus engine speed graph 700 is illustrated. In this graph 700, an engine speed 702 may be displayed along the x-axis while the power 704 generated at the corresponding engine speed 702 may be shown along the y-axis. The embodiment of FIG. 7 may be representative of the prime mover 140 used in the cotton harvester 100. More specifically it may be representative of a diesel or gas engine. A power curve 706 illustrates the fluctuation of power based on engine speed.

Also shown on the power curve 706 is a peak rated power 708. The peak rated power 708 may be a maximum power available to the prime mover 140 before engine speed 702 is reduced while operating the prime mover at a rated engine speed 712. In the cotton harvester 100, maintaining consistent engine speed 702 of the prime mover 140 may be beneficial to ensure all of the sub-assemblies will function properly. In other words, the sub-assemblies may be dependent on the prime mover 140 rotating at a consistent engine speed 702. In one non-exclusive example, the cotton feeding system may be mechanically driven by the prime mover 140 and rely on consistent engine speed while harvesting cotton. If the engine speed 702 is reduced to accommodate a high load condition, the cotton feeding system may no longer sufficiently transfer the cotton through the air duct system 112, thereby causing a clog.

To ensure the cotton harvester 100 will have sufficient power 704 to accommodate all of the subsystems, the cotton harvester 100 may be designed to function properly at a normal operating point 710 at the rated engine speed 712. In this embodiment, the normal operating point 710 may be determined by assuming ideal harvesting conditions such as level and dry ground, ideal cotton conditions, and all harvesting units 110 working efficiently. The typical normal point 710 at the rated engine speed 712 may not be the peak rated power 708 allowable at the corresponding engine speed 702 but rather be a reduced power load compared thereto. By setting the power for the normal operating point 710 lower than the peak power 708 at the corresponding rated engine speed 712, the prime mover 140 can accommodate moderate spikes in power draw due to non-ideal working conditions. Non-ideal working conditions may include muddy or uneven ground, wet cotton, or wear on the components of the cotton harvester 100. In other words, a buffer power zone 714 may be provided between the normal operating point 710 and the peak power 708 at the rated engine speed 712.

The buffer power zone 714 may be determined by the non-ideal working conditions that may be encountered while harvesting cotton. In one non-exclusive example, the cotton harvester 100 may be traveling up an incline, thereby requiring more power to the drive system than assumed at the normal operating point 710. In this situation, the power of the prime mover 140 may raise into the buffer power zone 714 to address the increased load on the prime mover 140. While the prime mover 140 remains in the power buffer zone 714, engine speed 702 is not affected. Accordingly, the engine speed 702 remains unaffected even under slightly greater loads than expected during ideal harvesting conditions and therefore the sub-assemblies continue to operate as expected.

In a conventional cotton harvester, the buffer power zone 714 may need to be large enough to accommodate many non-ideal working conditions without affecting engine speed 702. For example, the conventional cotton harvester may have mechanically driven doffer, spindle, drum, fan, cotton feeding system and drivetrain sub-assemblies. If any one of those sub-assemblies experiences an additional load, the buffer power zone 714, and in turn the prime mover 140, may require enough power to address the load without losing engine speed 702. Accordingly, the conventional cotton harvester 100 requires a prime mover 140 that has substantially more power than necessary under ideal conditions at the rated engine speed 710.

In certain high load conditions, the conventional cotton harvester 100 may require more power than allotted in the buffer power zone 714. In this situation, the buffer power zone 714 and the peak rated power 708 may be insufficient to accommodate the load. As a result, the prime mover 140 may begin to lose engine speed 702 until the power needs of the high load conditions are met at a high power point 716. Alternatively, if the high load conditions are too great, the prime mover 140 may stall, or otherwise shut off. While the prime mover 140 may be able to accommodate the high load at the high power point 716, the prime mover 140 does so by reducing engine speed 702. Accordingly, all of the sub-assemblies that are engine speed dependent may no longer function properly. In one non-limiting example, the reduced engine speed causes a reduced fan speed of the cotton feeding system, thereby potentially clogging the air duct systems 112. In another non-limiting example, the doffer and spindles may be mechanically coupled to the prime mover and the reduced engine speed may slow doffer and spindle speed, thereby causing plugs in one or more of the harvesting units 110. In short, reducing the engine speed of a conventional cotton harvester 100 with mechanically coupled sub-assemblies typically results in non-ideal performance of one or more of the sub-assemblies during cotton harvesting.

The conventional cotton harvester 100 may be equipped with a prime mover 140 that has enough power to generate a substantial buffer power zone 714 to accommodate high load conditions. However, because the conventional cotton harvester generally operates at the normal operating point 710, the prime mover 140 may be providing more power than necessary a majority of the time. In other words, the prime mover 140 of a conventional cotton harvester is sized to accommodate high load conditions without losing engine speed even though it may rarely require the power to accommodate the high load conditions. As a result, the conventional cotton harvester 100 typically has an oversized prime mover 140 that is inefficiently providing more power than necessary during ideal harvesting conditions.

Figure 8:
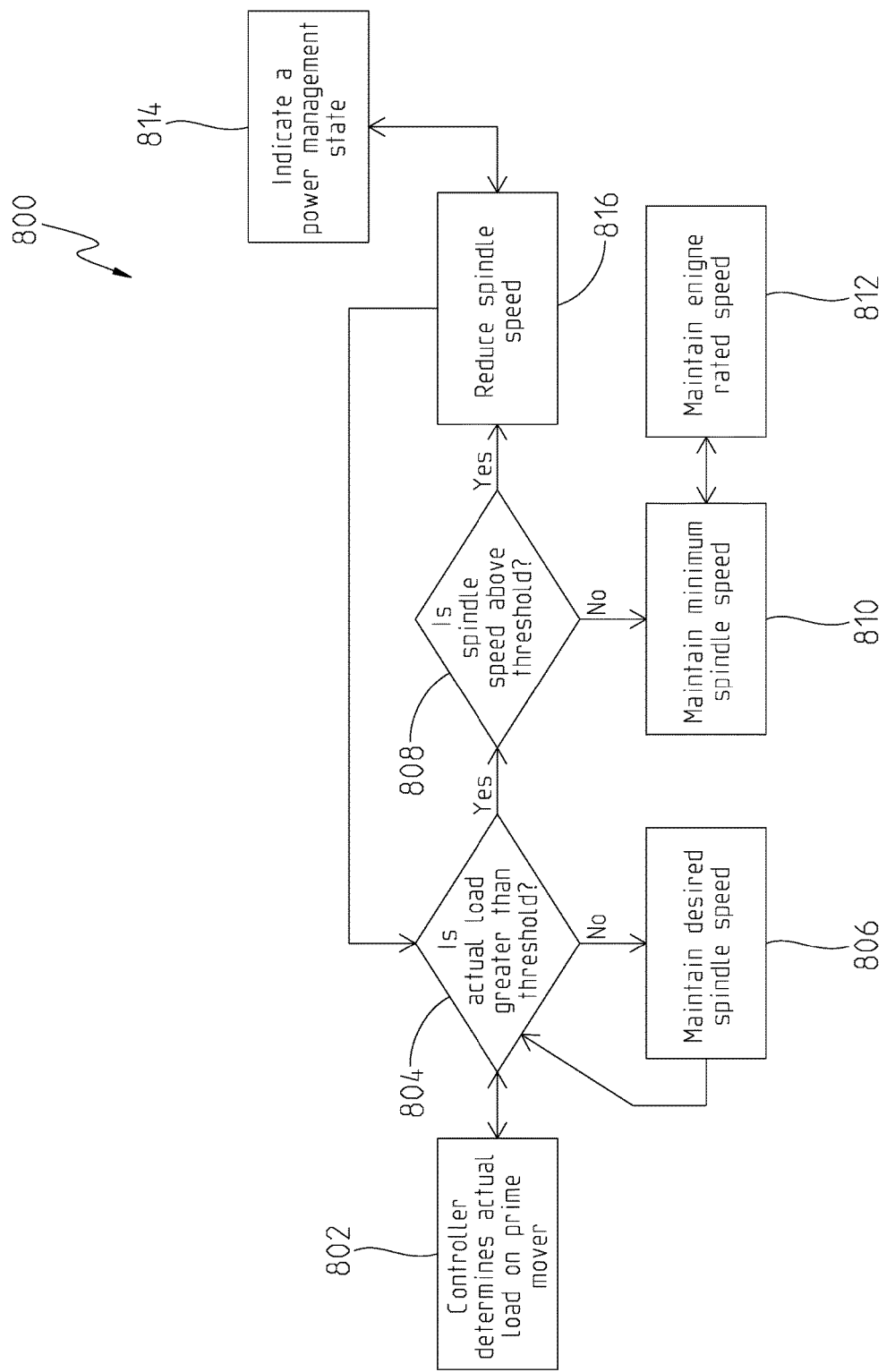
FIG. 8 is a schematic view of a power control system.

Referring now to FIG. 8, a control system 800 flowchart is illustrated for managing power distribution in the cotton harvester 100 with variable spindle, doffer, and/or drum control. The control system 800 may be stored and implemented with the controller 510 described above or it may be part of a separate controller having a processor and a memory, unit. A person having skill in the relevant art understands the control system 800 can be stored and implemented utilizing a plurality of different controllers and this disclosure is not limited to any particular one.

The control system 800 may be implemented on a cotton harvester 100 having an independently powered doffer, spindle, and/or drum, several embodiments of which are explained herein. In this control system 800, an active prime mover load may be determined in box 802. More specifically, in box 802 the controller 510 may utilize one or more sensors to determine the overall load acting on the prime mover 140. A person having skill in the relevant art understands the many ways to determine the load on a prime mover, and this disclosure is not limited to any one.

Once the load on the prime mover 140 is identified in box 802, the controller 510 compares the active load to a load threshold in box 804. In one non-exclusive example, the load threshold could be the peak rated power 708. In a different example, the load threshold could be any power within the buffer power zone 714. In yet another example, the load threshold could be any point on the power curve 706. Further still, the load threshold could be about 95-98% the peak rated power 708. In one non-exclusive example, the load threshold is a value that identifies when a high load condition is occurring prior to engine speed being reduced.

Whatever the load threshold may be, if the controller 510 determines the active prime mover 140 load is less than the load threshold, the controller 510 will maintain or alter the spindle, doffer, and drum speed to preset values as indicated in box 806. In one embodiment, the active prime mover load will be less than the load threshold during ideal harvesting conditions. Further still, the desired spindle, doffer, and drum speed of box 806 may be preset values stored in the controller or variables that are set by the user or based on other operating conditions of the cotton harvester 100 such as vehicle speed.

However, if the active prime mover load is equal to or greater than the load threshold in box 804, the controller may compare any one or more of the spindle speed, the doffer speed, and the drum speed to a minimum speed threshold as shown in box 808. In one non-exclusive example, the spindle speed may be controlled independently from the drum speed and vehicle speed as described above. In this configuration, at box 808 the controller 510 may receive inputs identifying the speed of the spindles and compare the spindle speed to a minimum speed threshold. The minimum speed threshold may be a preset threshold stored in the controller 510 or a user-defined threshold value that can be altered by a user input.

In one embodiment, the minimum spindle speed threshold may be a function of the vehicle speed. In this embodiment, when the minimum spindle speed may vary with vehicle speed. In yet another embodiment, the minimum spindle speed may be a preset minimum spindle speed implemented when the vehicle speed is at or above a minimum harvesting speed. In one non-exclusive example of this embodiment, the minimum harvesting speed may be between about 1 and 2 miles per hour and the minimum spindle speed could be around 3500-4500 revolutions per minute. However, this disclosure is not limited to the precise speeds discussed and higher and lower harvesting speeds and spindle speeds are also considered.

At box 808, if the controller 510 identifies that the spindle speed is at or below the minimum spindle speed threshold, the controller 510 will move on to box 810 where the controller maintains the minimum spindle speed. At substantially the same time, the controller will execute box 812 where the controller 510 maintains the rated engine speed 712 if possible. Boxes 810 and 812 are executed when the controller 510 cannot harvest any more power by reducing the spindle speed any further. In other words, the minimum spindle speed threshold is the lowest speed at which the spindles can properly harvest cotton.

However, if at box 808 the controller 510 determines that the spindle speed is greater than the spindle speed threshold, the controller 510 may reduce the spindle speed at box 816. The controller 510 may reduce the spindle speed to increase the amount of power available to other sub-assemblies of the cotton harvester 100. In one example, the spindle speed may be reduced by 10% before the controller moves back to box 804 to compare the actual engine load to the load threshold. If the actual engine load is still greater than the load threshold, boxes 808, 816, and 804 are repeated until the minimum spindle speed threshold is reached. In any event, if the actual load on the prime mover 140 is greater than the load threshold, the controller 510 will begin reducing the spindle speed to provide additional power to other sub-assemblies of the cotton harvester 100 until the minimum spindle speed threshold is met.

In one embodiment of the control system 800, an indicator can identify when the controller 510 is reducing spindle speed in box 814. The indicator can be any form of audio, visual, or sensory input that identifies to the user that the spindle speeds are being modified by the controller 510. In a different embodiment, however, there may be no indication at all when the controller 510 modifies the spindle speed.

The minimum spindle speed threshold of box 808 may differ depending on the application. In one non-limiting example, the minimum spindle speed threshold may be set somewhere between about 3800-4400 revolutions per minute (RPM), in another embodiment, the minimum spindle speed threshold may be greater than 4400 RPM. In yet another embodiment, the minimum spindle speed threshold may be less than 3800 RPM. The particular minimum spindle speed threshold may be a speed that provides sufficient additional power to other sub-assemblies of the cotton harvester 100 without substantially reducing spindle and doffer effectiveness while harvesting.

As suggested above, box 808 may compare doffer speed to a minimum doffer speed threshold instead of spindle speed. This embodiment may work substantially the same as the one described above, except boxes 808, 810, 812, and 816 may be referring to doffer speed instead of spindle speed. Accordingly, in this embodiment, the minimum doffer speed may differ from the minimum spindle speed described above. However, in a different embodiment the doffer speed may be a direct ratio to spindle speed and therefore the doffer speed will change responsive to a change in the spindle speed or vice versa.

Alternatively, in yet another embodiment box 808 may compare drum speed to a minimum drum speed threshold instead of spindle speed. This embodiment may work substantially the same way as the one described above, except boxes 808, 810, 812, and 816 may be referring to drum speed instead of spindle speed. Accordingly, in this embodiment, the minimum drum speed may differ from the minimum spindle speed described above. In another embodiment, the minimum drum speed may be a ratio of the vehicle speed. In this embodiment, the drum speed and vehicle speed may be reduced when the load is greater than the load threshold.

In another embodiment, each of the spindle speed, doffer speed, and drum speed may be compared to a corresponding minimum threshold. In this embodiment, when the actual load is greater than the load threshold in box 804 the controller 510 may first compare the spindle speed to the minimum spindle speed threshold in box 808. If the spindle speed has been reduced to the minimum spindle speed threshold, the controller 510 may then compare the doffer speed to the minimum doffer speed threshold. If both the spindle and the doffer speeds have been reduced to the corresponding minimum speed threshold, the controller 510 can compare the drum speed to the minimum drum speed threshold and adjust the drum speed accordingly. This embodiment may be performed in any order and is not meant to be limited to the order described above. Further, in one aspect of this embodiment each of the spindle speed, doffer speed, and drum speed may be compared to their corresponding minimum values by the controller 510 at substantially the same time.

Figure 9:
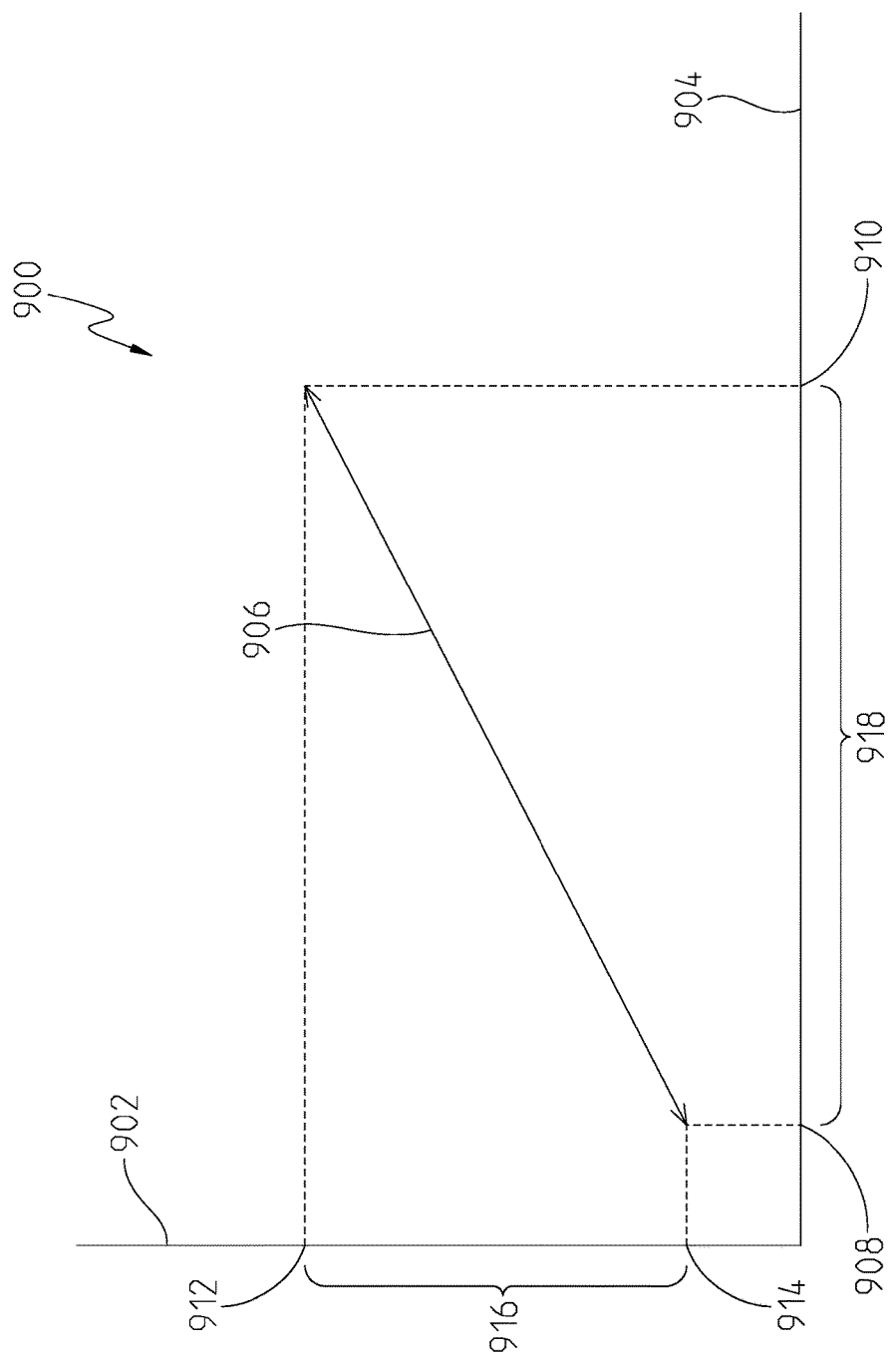
FIG. 9 is a graph view representing spindle speed versus spindle power consumption of the cotton harvester.

Referring now to FIG. 9, a spindle speed versus spindle power consumption graph 900 is shown. More specifically, the graph 900 has an x-axis 902 indicating the power required to operate the spindles at the corresponding spindle speed shown by the y-axis 904. Further, a spindle power curve 906 is positioned therein. The spindle power curve 906 may be positioned between a minimum spindle speed 908 and a maximum spindle speed 910 within a preset or adjustable speed range 918. The maximum spindle speed 910 may be the spindle speed that provides the most efficient harvesting of cotton and the minimum spindle speed 908 may be the minimum speed that the spindles can rotate without becoming substantially inefficient at harvesting cotton. In one embodiment, the minimum spindle speed 908 is the minimum spindle speed threshold described above for box 808 and the maximum spindle speed 910 is the desired spindle speed described above for box 810.

As illustrated by the graph 900, transitioning the spindle speed towards the minimum spindle speed 908 can result in a substantial power savings. More specifically, when the spindle speed is at the maximum spindle speed 910, prime mover 140 may be dedicating a maximum spindle power 912 to rotating the spindles. However, if the spindles speed is reduced to the minimum spindle speed 908, the prime mover 140 may only be dedicating a minimum spindle power 914 to rotating the spindles. In other words, a potential power difference 916 may be defined by the difference between the maximum spindle power 912 and the minimum spindle power 914. Further, the potential power difference 916 may be the amount of power available to contribute to other sub-assemblies of the cotton harvester 100.

In one non-exclusive example, the maximum spindle speed 910 may be between about 4500-5000 RPM and correspond with the maximum spindle power 912 per row unit. Further, the minimum spindle speed 908 may be between about 4000-4400 RPM and correspond with the minimum spindle power 914 per row unit. While particular speeds and power savings have been described in detail above, this disclosure is not limited to these specific values, and they have been provided only as a reference.

Figure 10:
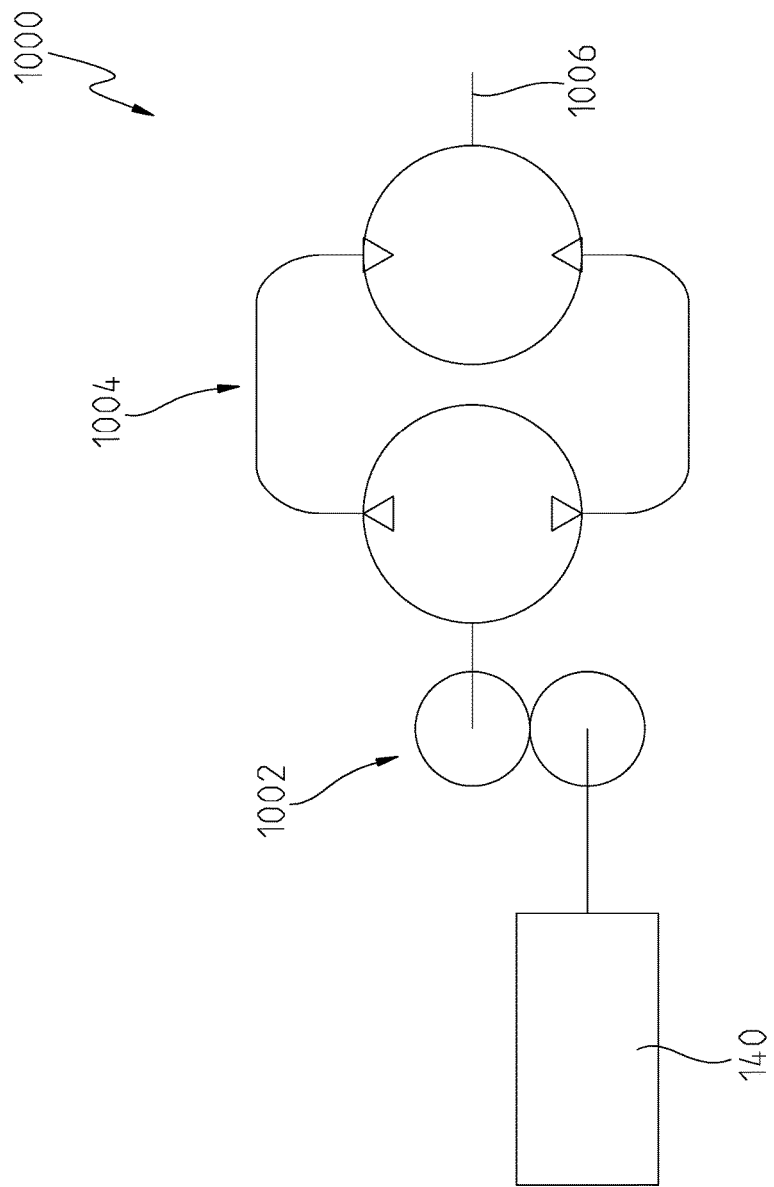
FIG. 10 is a schematic view of an exemplary hydraulic drive system for a sub-assembly of the cotton harvester.

Referring now to FIG. 10, one non-exclusive example of a hydraulic drive system 1000 for the spindles is illustrated. The hydraulic drive system 1000 may have a pump drive 1002 coupled to the prime mover 140. The pump drive 1002 may provide pressurized hydraulic fluid to a hydrostatic drive 1004 that in turn has a drive input 1006 coupled thereto. The drive input 1006 may be coupled to provide power to the spindles of the respective cotton harvester unit 200. Further, the hydrostatic drive 1004 may provide variable speeds to the drive input 1006. In one embodiment, the controller 510 may direct the hydrostatic drive 1004 to provide the desired drive input 1006 speed and in turn the desired spindle speed. In this embodiment, the controller 510, through the hydrostatic drive 1004, may alter the spindle speed between the minimum spindle speed 908 and the maximum spindle speed 910.

The efficiency of the spindle drive system may also affect the potential power difference 916. For example, the hydraulic drive system 1000 illustrated in FIG. 10 may have an efficiency of about 75% the power provided by the prime mover 140. In this embodiment, reducing the spindle speed through the hydrostatic drive 1004 may provide greater power savings to the prime mover 140. In other words, the power 902 is referring to the power needed at the drive input 1006. Accordingly, the potential power difference 916 does not consider the efficiency of the hydrostatic system 1004.

In one non-exclusive example, the potential power difference 916 may be at about 4 horsepower per harvester unit 200. In this example, the 75% efficiency of the hydraulic drive system 1000 means that the actual power savings to the prime mover 140 is 5⅓ horsepower. Accordingly, the potential power difference 916 may allow additional power savings to the prime mover 140 depending on the efficiency of the spindle drive system.

In one non-exclusive example of the control system 800, the cotton harvester 100 may be harvesting cotton under ideal conditions when the ground is flat and the cotton is ideal for harvesting. Under these conditions, the controller 510 determines in boxes 802 and 804 that the actual load on the prime mover 140 is less than the load threshold. Accordingly, the controller 510 will maintain or raise the spindle speed to the desired preset or user-input spindle speed in box 806. The controller 510 may continually execute boxes 802, 804, 806 to monitor engine load and the cotton harvester 100 is operating in ideal conditions.

In a different non-exclusive example, however, the cotton harvester 100 may be harvesting cotton under ideal conditions as the cotton harvester 100 approaches a steep grade. When the cotton harvester 100 begins ascending the steep grade, the controller 510 may determine that the actual load from box 802 becomes greater or equal to the load threshold in box 804 because of the increased power required by the drivetrain of the cotton harvester 100 to ascend the steep grade. In order to maintain the rated engine speed 712 while simultaneously addressing the increased load on the prime mover 140, the controller 510 may reduce the spindle speed at box 816. The controller 510 may continuously reduce the spindle speed in boxes 804, 808, 816 until the reduced spindle speed has freed sufficient power from the prime mover 140 to address the increased load for ascending the grade. In other words, the increased power requirements for ascending the steep grade are met by decreasing the power requirements of the spindles by slowing the spindle speed. Boxes 804, 806, 816 may continuously be executed by the controller either until the actual load on the prime mover is lower than the load threshold or the spindle speed is reduced to the minimum spindle speed threshold.

The controller 510 executes the control system 800 to address many different load conditions. In another non-exclusive example, muddy or otherwise difficult ground conditions may increase the load on the cotton harvester 100. In yet another example, the cotton fan, engine fan or cotton feeding system may experience higher than usual loads that are addressed by the control system 800.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cotton harvester, comprising:
   a prime mover providing power to the cotton harvester;
   a controller monitoring a load on the prime mover and storing a load threshold;
   a drum rotatable about a first axis at a drum speed;
   a plurality of spindles for harvesting cotton, the plurality of spindles rotatable at a spindle speed; and
   a doffer assembly rotatable about a second axis at a doffer speed;
   wherein, when the controller detects the load on the prime mover is greater than the load threshold, the spindle speed is reduced.

2. The cotton harvester of claim 1, wherein power to the plurality of spindles is variable relative to power to the drum.

3. The cotton harvester of claim 1, further comprising:
   a ground drive assembly;
   an engine fan; and
   a cotton feeding system;
   wherein the load monitored by the controller includes a load generated by the ground drive assembly, engine fan, and cotton feeding system.

4. The cotton harvester of claim 1, further comprising:
   an engine as the prime mover, the engine having a variable engine speed; and
   an ideal engine speed threshold stored in the controller;
   wherein, when the controller detects the load on the prime mover is greater than the load threshold, the spindle speed is reduced and the engine speed remains within the ideal engine speed threshold.

5. The cotton harvester of claim 1, further wherein, a minimum spindle speed threshold is stored in the controller and the controller maintains the spindle speed above the minimum spindle speed threshold when the load on the prime mover is greater than the load threshold.

6. The cotton harvester of claim 1, wherein, when the controller detects the load on the prime movers is less than the load threshold, the spindle speed is greater than a minimum spindle speed and less than or equal to a maximum spindle speed.

7. The cotton harvester of claim 1, further wherein, the spindle speed and the doffer speed have a corresponding speed ratio.

8. The cotton harvester of claim 1, further wherein, the plurality of spindles and the doffer assembly are mechanically coupled to one another and the spindle speed and the doffer speed is a fixed speed ratio.

9. The cotton harvester of claim 1, further wherein, when the spindle speed is reduced, an indicator generates a signal.

10. The cotton harvester of claim 9, further wherein, the signal is an audible or visual signal.

11. A method for controlling power in a cotton harvester, comprising:
    providing a controller, a prime mover controlled by the controller, at least one load sensor communicating to the controller a load on the prime mover, a spindle assembly powered by the prime mover, and a spindle speed sensor communicating a spindle speed generated by the spindle assembly;
    storing, in the controller, a load threshold and a minimum spindle speed threshold;
    determining, with the controller, the load on the prime mover with the load sensor;
    determining, with the controller, the spindle speed with the spindle speed sensor; and
    reducing the spindle speed, with the controller, when the actual load is above the load threshold and the spindle speed is above the spindle speed threshold.

12. The method for controlling power in a cotton harvester from claim 11, further comprising storing an ideal spindle speed in the controller;
    wherein, when the actual load is less than the load threshold, the spindle assembly rotates at the ideal spindle speed.

13. The method for controlling power in a cotton harvester from claim 12, wherein when the actual load is greater than the load threshold, the controller instructs the spindle assembly to rotate at a speed between the ideal spindle speed and the spindle speed threshold.

14. The method for controlling power in a cotton harvester from claim 11, further comprising:
    providing an indicator capable of indicating a signal to a user; and
    engaging the indicator, with the controller, to signal the user when the spindle speed is reduced.

15. A cotton harvester system having a cotton harvester unit, comprising:
    a controller in communication with the cotton harvester system;
    a prime mover configured to generate power;

a plurality of sub-assemblies powered by the prime mover, the plurality of sub-assemblies including a doffer assembly configured to rotate doffers at a doffer speed;

wherein, when the controller identifies a high load condition, power to the doffer assembly is reduced.

16. The cotton harvester of claim 15, further wherein the sub-assemblies comprise:

a spindle assembly configured to rotate spindles at a spindle speed;

a drum assembly configured to rotate drums at a drum speed.

17. The cotton harvester of claim 15, wherein the prime mover provides power to the sub-assemblies through any of a hydraulic pump, an electric generator, or a mechanical linkage.

18. The cotton harvester of claim 15, wherein one of the plurality of sub-assemblies is a spindle assembly provided hydraulic power from the prime mover.

19. The cotton harvester of claim 15, wherein one of the plurality of sub-assemblies is a spindle assembly provided electric power from a generator powered by the prime mover.

20. The cotton harvester of claim 18, wherein hydraulic power to the spindle assembly is reduced when the controller identifies the high load condition.

\* \* \* \* \*